US007418595B2

(12) United States Patent
Eronen et al.

(10) Patent No.: US 7,418,595 B2
(45) Date of Patent: Aug. 26, 2008

(54) REPLAY PREVENTION MECHANISM FOR EAP/SIM AUTHENTICATION

(75) Inventors: Pasi Eronen, Helsinki (FI); Henry Haverinen, Jyväskylä (FI); Kaisa Nyberg, Helsinki (FI)

(73) Assignee: Nokia Siemens Networks Oy (FI)

( * ) Notice: Subject to any disclaimer, the term of this patent is extended or adjusted under 35 U.S.C. 154(b) by 772 days.

(21) Appl. No.: 10/751,300

(22) Filed: Jan. 2, 2004

(65) Prior Publication Data

US 2005/0149734 A1   Jul. 7, 2005

(51) Int. Cl.
*H04L 9/00* (2006.01)

(52) U.S. Cl. .......................... 713/168; 455/411; 380/44

(58) Field of Classification Search ................ 713/176, 713/161, 168, 170; 380/247, 255, 44; 726/22, 726/26, 35; 455/411
See application file for complete search history.

(56) References Cited

U.S. PATENT DOCUMENTS

| 6,920,477 B2* | 7/2005 | Mitzenmacher ............. 709/203 |
| 2004/0162105 A1* | 8/2004 | Reddy et al. ................ 455/551 |
| 2005/0108368 A1* | 5/2005 | Mohan et al. ............... 709/220 |

OTHER PUBLICATIONS

B. H. Bloom. Space/Time Trade-offs in Hash Coding with Allowable Errors. Communications of the ACM, vol. 13, No. 7, Jul. 1970, 422-426.*
H. Haverinen and J. Salowey (editor). EAP SIM Authentication, Feb. 2003, http://www.ietf, org/internet-drafts/draft-haverinen-pppext-eap-sim- 10.txt.*
S. Patel. Analysis of EAP SIM Session key Agreement. IETF EAP mailing list, May 29, 2003.*
S. Dharmapurikar, P. Krishnamurthy, and D. Taylor, SIGCOMM'03, Aug. 25-29, 2003, pp. 201-212.*
Sarvar Patel, Analysis of EAP-SIM Session Key Agreement, Lucent Technologies, sarvar@lucent.com, IETF EAP mailing list, May 29, 2003, (as published on the Internet).
B. H. Bloom. Space/Time Trade-offs in Hash Coding with Allowable Errors. *Communications of the ACM*, vol. 13, No. 7, Jul. 1970, 422-426.
L. Carter, R. Floyd, J. Gill, G. Markowsky, M. Wegman. Exact and Approximate Membership Testers. *Proceedings of STOC 1978*, 59-65.

(Continued)

*Primary Examiner*—Gilberto Barron, Jr.
*Assistant Examiner*—Canh Le
(74) *Attorney, Agent, or Firm*—Ware, Fressola, Van Der Sluys & Adolphson LLP

(57) ABSTRACT

A method for use by a telecommunication terminal (10) in checking whether a candidate RAND in an EAP/SIM RAND challenge is likely a replay, based on using a Bloom filter including a vector data structure (21) for determining (admittedly sometimes erroneously) whether the candidate RAND is in a set of previously used RAND values. The components of the vector data structure (21) are set to one or left at zero depending on whether pointers corresponding to the previously used RAND values point to them. The pointers can be hash functions or can be constructed from the previously used RAND values. To provide for smooth filter performance at points in time when the Bloom filter is full and cannot hold information for any new previously used RAND values, the vector data structure (21) is partitioned into more than one part, and only one part is reset and re-initialized at a time.

11 Claims, 2 Drawing Sheets

OTHER PUBLICATIONS

K. Nyberg. Fast Accumulated Hashing. In D. Gollman (Ed.) *Fast Software Encryption 1996*. LNCS 1039, Springer-Verlag 1996, 83-88.

H. Haverinen and J. Salowey (editor). EAP SIM Authentication, Feb. 2003, http://www.ietf.org/internet-drafts/draft-haverinen-pppext-eap-sim-10.txt.

* cited by examiner

REPLAY PREVENTION MECHANISM FOR EAP/SIM AUTHENTICATION

TECHNICAL FIELD

The present invention pertains to the field of wireless telecommunications. More particularly, the present invention pertains to mechanisms providing security in authentication in regard to replay attacks, and is aimed at improving network access security in SIM based authentication.

BACKGROUND ART

The GSM (Global System for Mobile Communications) authentication system has a number of problems, such as the lack of network authentication, the lack of replay protection, and that only the network contributes to the cryptographic independence of session keys. The EAP/SIM (Extensible Authentication Protocol/Subscriber Identity Module) authentication specifies how GSM authentication can be used to provide authentication for WLAN (Wireless Local Area Network) access in the IEEE 802.1X framework. EAP/SIM authentication is an extension to the EAP proposed by the IETF (Internet Engineering Task Force) enabling authentication and session key distribution using the GSM SIM.

The EAP/SIM mechanism specifies enhancements to GSM authentication and key agreement whereby multiple authentication triplets—a so-called RAND (random number) value, a root key $K_i$, and a 32-bit value SRES—can be combined to create authentication response and encryption keys of greater strength than the individual GSM triplets. The mechanism also introduces network authentication, user anonymity and a re-authentication procedure.

The current EAP/SIM authentication specification addresses some of the problems. Some problems remain, partly because they were not considered a concrete threat, and partly because their solutions were considered too complex. For example, the known solutions for replay protection were considered too complex. Recently, in a note posted on the EAP discussion list (S. Patel; Analysis of EAP SIM Session key Agreement; IETF EAP mailing list, May 29, 2003), S. Patel (of Lucent Technologies) discussed two problems in the EAP/SIM mechanism: using a simple active attack the 128-bit security level of EAP/SIM authentication can be reduced to the 64-bit security of GSM; and sessions are not independent, in the sense that if an attacker gets hold of an authentication triplet, it can force the terminal to use an encryption key known to the attacker.

To raise its security level from the 64-bit GSM level, EAP/SIM combines secret session keys from two or three authentication triplets. Patel's first attack is performed by repeating the same triplet as many times as needed by one EAP/SIM authentication.

Previously, it was shown that EAP/SIM security can be reduced to the GSM security level in case of a dual-mode terminal by implementing a false GSM base station that challenges the terminal by resending RAND values previously used in an EAP/SIM authentication (by the terminal). (The RAND is a 128-bit number used with a root key $K_i$ (up to 128 bits) to generate a 64-bit key $K_c$ and a 32-bit value SRES. The RAND, SRES, and $K_i$ values are said to form a triplet.) Then by analyzing the encrypted GSM voice or data sent by the terminal, the attacker recovers the GSM encryptions keys. This is feasible in particular if the false base station forces the terminal to use the weak A5-2 GSM encryption algorithm. The reason why this attack works is that different session keys are not independent, which is also the main security problem in Patel's second attack. Patel's second attack typically involves reused triplets. If an attacker gets hold of fresh triplets, clearly nothing can be done.

The prior art does not provide a solution to the EAP/SIM authentication problems; in Patel's report a solution by storing all previous used RANDs is discussed but deemed impractical. (In UMTS (Universal Mobile Telecommunications System) security, the replay problem of GSM has been taken into account and removed by a specification of a complex replay prevention method, which involves both HLR (Home Location Register) and the terminal.)

DISCLOSURE OF THE INVENTION

Accordingly, in a first aspect of the invention, a method is provided by which a terminal determines whether a candidate RAND included in a RAND challenge is a member of a set of previously used RANDs, characterized by: a step of encoding the previously used RANDs using a data structure consisting of an ordered set of components having component values derived from the previously used RANDs wherein each component has a value of one or zero depending on whether it is pointed to by one or more pointers each having a value based on a digest of all the bits of a respective previously used RAND or having a value otherwise derived from all the components of a respective previously used RAND so that in either case all bits of the RAND contribute in determining the value of the component; and a step of checking the data structure to determine whether the data structure indicates whether the candidate RAND is a member of a set of previously used RANDs; wherein the data structure is such as to at least provide a true answer as to whether the candidate RAND is not an element of the set of previously used RANDs.

In accord with the first aspect of the invention, in the step of encoding the previously used RANDs, a set of hash functions may be used each having a range equal to the number of components of the data structure, and for each previously used RAND, each of the hash functions is evaluated and the component in the ordered set of components at the position indicated by the hash function value is set to one. Further, the previously used RAND values may serve as the hash functions based on using the RAND values as pointers to components of the data structure.

Also in accord with the first aspect of the invention, the data structure may be a multi-part data structure with each part having an upper limit on the number of RAND values it can indicate as belonging to the set of previously used RAND values, and further, when an upper limit is reached for one of the parts, another of the parts may be reset.

In a second aspect of the invention, a computer program product is provided comprising: a computer readable storage structure embodying computer program code thereon for execution by a computer processor in a terminal, with said computer program code characterized in that it includes instructions for performing the steps of a method of according to the first aspect of the invention.

In a third aspect of the invention, an apparatus is provided included in a telecommunication terminal and by which the telecommunication terminal determines whether a candidate RAND included in a RAND challenge is a member of a set of previously used RANDs, characterized by: means for encoding the previously used RANDs using a data structure consisting of an ordered set of components having component values derived from the previously used RANDs wherein each component has a value of one or zero depending on whether it is pointed to by one or more pointers each having a value based on a digest of all the bits of a respective previously used RAND or having a value otherwise derived from all the components of a respective previously used RAND so that in either case all bits of the RAND contribute in determining the value of the component; and means for checking the data structure to determine whether the data structure indicates whether the candidate RAND is a member of a set of previously used RANDs; wherein the data structure is such as to at least provide a true answer as to whether the candidate RAND is not an element of the set of previously used RANDs.

In a fourth aspect of the invention, a system is provided, comprising a telecommunication terminal and a radio access network configured for cellular communication with the telecommunication terminal, characterized in that the telecommunication terminal includes an apparatus according to the third aspect of the invention.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention is a mechanism improving the security of EAP/SIM authentication against known replay attacks, such as those discussed by Patel in the above-referenced note; it provides a method by which a terminal can detect if an authentication challenge RAND in a SIM-based authentication was a replay. The invention also provides a method by which a terminal can inform the access network that it has detected a replayed RAND. The mechanism is implemented in a wireless terminal (a WLAN terminal or a dual-mode terminal), as opposed to a network element such as an authentication server. Thus, the invention is superior to the UMTS replay prevention system in that the invention solution does not require any changes in the network elements. Optionally, the improved security against replay attack provided by the invention can be further improved by implementing supporting functionality in the local authentication server.

Although the invention is aimed at improving WLAN access security in SIM-based authentication, in principle it can also be used in GSM authentication. Unfortunately, replaying of triplets is allowed in GSM as a standard procedure in case the VLR runs out of fresh triplets, and cannot contact the HLR for new ones.

Storing Information of Used RANDs

Figure 1:
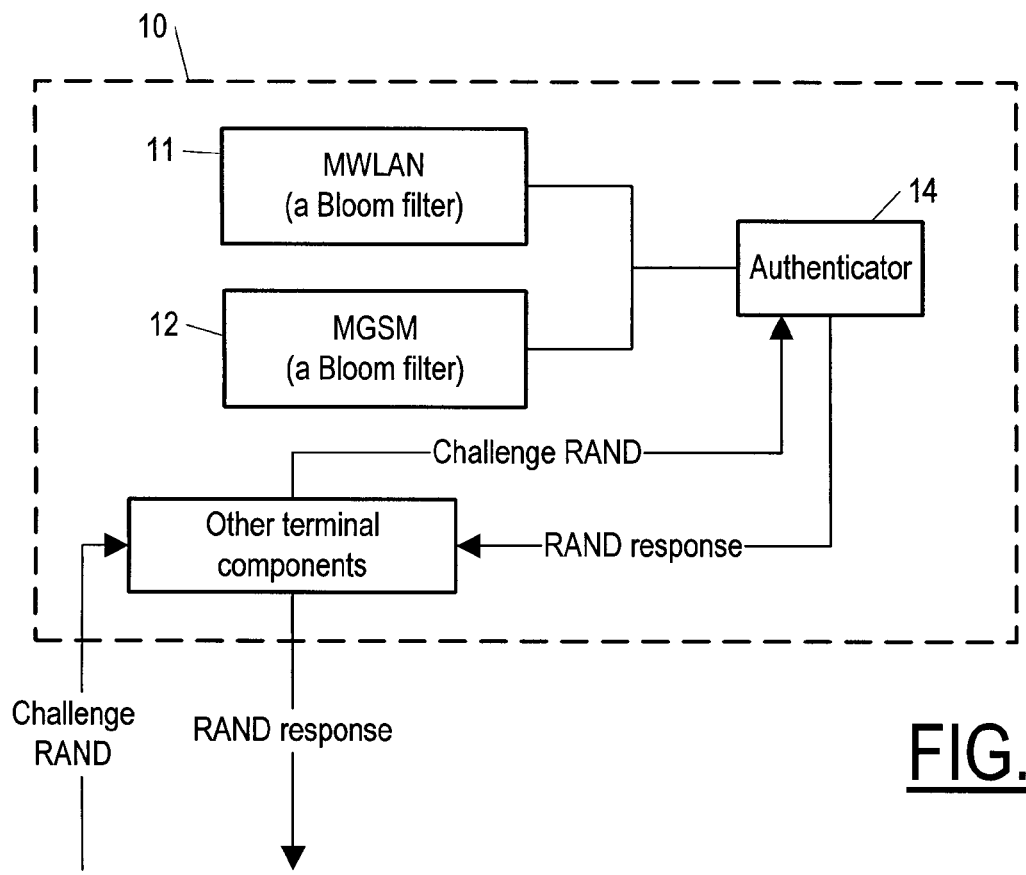
FIG. 1 is a block diagram/flow diagram of a telecommunication terminal, showing only components relevant to the invention and so having to do with receiving and responding to a RAND challenge by checking for a RAND replay using one or more Bloom filters.

Referring now to FIG. 1, when a (telecommunication) terminal 10 is adapted according to the invention, it uses a special module—including data and a corresponding procedure that can be queried about the data—to store information on used RANDS. If the terminal is dual-mode (i.e. if it is adapted for use with GSM and also UMTS), then it can advantageously use two different special modules: a so-called MWLAN module 11 (i.e. module for the WLAN mode) in which the terminal stores information on RANDs that have been used for EAP SIM authentication; and a MGSM module 12 (i.e. module for the GSM mode) in which the terminal stores information on RANDs used for GSM. When the terminal 10 receives a new challenge RAND for EAP SIM authentication, it passes it to an authenticator module 14, which checks it against the information stored in the MWLAN module 11 and also the MGSM module 12 to determine whether the RAND has been used before, by querying each of the modules. When the terminal 10 receives a challenge RAND for GSM authentication, it passes the challenge RAND to the authenticator module 14, which then verifies that the RAND has not previously been used for EAP SIM authentication using information stored in the MWLAN data store 11. After checking the appropriate module(s) 11 12, the terminal 10 provides a RAND challenge response.

How effective this approach is depends a lot on the frequency of SIM-based authentication. According to some estimates, a likely maximum authentication rate is 10 per day. Therefore, it is reasonable to use $2^{13}$ (=8,192) as an upper bound on the number of RANDs to be stored and verified. To store $2^{13}$ RAND values requires one Megabit of memory (at 128 bits per RAND).

Memory Trade-Off

A one-Megabit memory requirement can be significantly reduced by applying some trade-offs in which memory is saved by allowing some errors, false positives, or false negatives to occur when the terminal 10 queries the MWLAN and MGSM modules 11 12 for a candidate's information, i.e. for whether a RAND is used, according to the information stored in the MWLAN and MGSM modules 11 12. In one tradeoff, a so-called Bloom filter (a data item and corresponding procedure) is used for both the MWLAN and MGSM modules 11 12.

Figure 2:
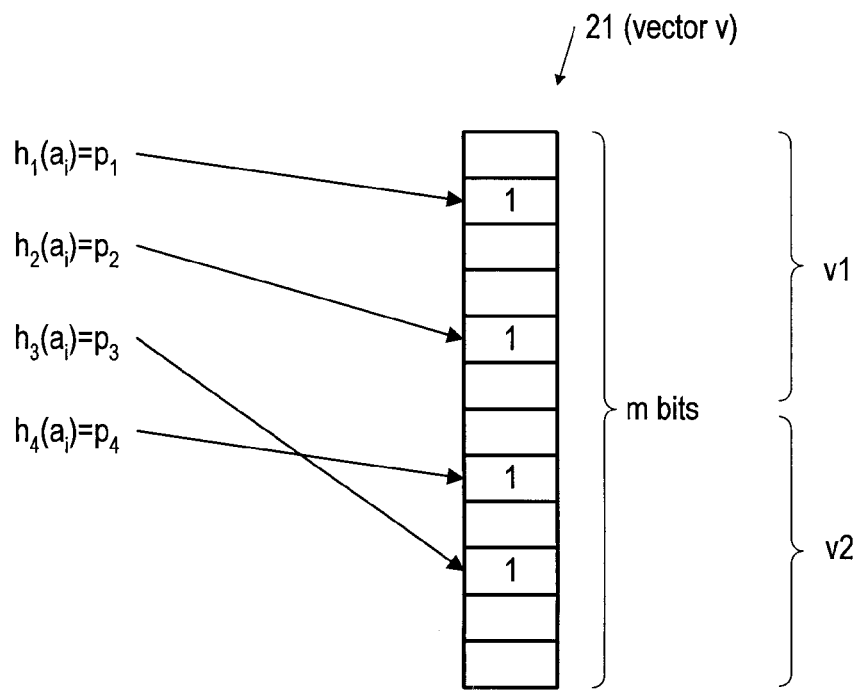
FIG. 2 is a schematic illustration of a vector data structure used by the one or more Bloom filters of FIG. 1, and indicating how pointers are used to set (to the value one) corresponding components of the vector.

Referring now also to FIG. 2, a Bloom filter 11 12 is a procedure (not separately shown) and a vector data structure 21—one in both the MWLAN data structure 11 and the MGSM data structure 12, where the vector data structure 21 (at least approximately) represents membership in a set R of RAND keys. More specifically, given a set R of n RAND keys, and given a query as to whether a candidate key is a member of the set R, a Bloom filter refers to the vector data structure 21 having component values based on the member keys, to (approximately) determine whether the candidate key is a member.

Even more specifically, and still referring to FIG. 2, to (approximately) check whether a key b is in the set R of n keys indicated here as $a_1, a_2, \ldots, a_n$, the vector data structure 21, indicated here as v and having m bits, is used by the Bloom filter procedure, with m chosen so as to make possible "storing" a predetermined number of RANDS. Initially, all m bits of v are set to 0. Then using $k \leq m$ (for some k selected as described below) independent hash functions—indicated here as $h_1, h_2, \ldots, h_k$—each with range 1 . . . m, for each element $a_i$ in the set R of keys $a_1, a_2, \ldots, a_n$, the bits at positions $h_1(a_i)=p_1, h_2(a_i)=p_2, \ldots, h_k(a_i)=p_k$ in v are set to one (by the Bloom filter procedure or a separate, auxiliary procedure). Thus, any bit of the vector v 21 might be set to one more than once, either because $h_k(a_i)=h_1(a_i)$ or because $h_k(a_i)=h_k(a_j)$, i.e. either because for the same key different ones of the hash functions yield the same position, or because for different keys, the same hash function yields the same position (or both). For each used RAND, after computing its hash functions—which are sometimes called digests in that they can be viewed as providing a digest (a shorter version representation) of the argument (a RAND)—the RAND is of course discarded. The process of computing the hash functions for a used RAND and setting the pointed-to components of the vector v to one goes on until the Bloom filter vector v "fills up," i.e. cannot effectively indicate any further previously used RANDS. (In the extreme, all components of the vector v become 1, in which case the vector v is of useless.)

Now, to check whether a key b is in the set R, the Bloom filter is queried with the key b, and in response the Bloom filter (procedure) checks the bits of the vector v 21 at positions $h_1(b), h_2(b), \ldots, h_k(b)$ (which might be all the same bit position). If any of them is 0, then b is not in the set R. Otherwise b might be in the set, although there is a certain probability that it is not, in which case the Bloom filter provides what is called a "false positive." The parameters k and m are chosen so that the probability of a false positive (and hence a false hit) is acceptable. When information for n keys is stored in the Bloom filter, then the probability of a false positive is:

$$\left(1-\left(1-\frac{1}{m}\right)^{kn}\right)^k \approx (1-e^{-kn/m})^k$$

and is minimized when $k=\ln(2) \times m/n$.

Using k bits per RAND value (i.e. using k pointers per RAND for pointing to up to k bits in the vector v of m bits and setting to one each of the pointed-to bits, which may be less than k bits because different pointers can point to the same bits), to "store" $2^{13}$ (8,192) RAND values using a Bloom filter requires $m=k \times 2^{13}/\ln(2)$ (rounded to an integer value) bits of memory if the small probability of false positives given in the above formula is allowed—as opposed to one Megabit of memory (8,912 RAND*128 bits/RAND) needed for (actually) storing the $2^{13}$ RAND values (i.e. for storing the RAND values themselves, not for setting values of the vector v to indicate whether the RAND values are in the set R). Thus there is a memory savings if k is small enough (i.e. if $k/\ln(2) < 128$). The Bloom filter can be optimized for applications in which the great majority of the data items to be tested will not belong to the given set, as is expected to be the case in the present application. A Bloom filter has the property that, on average, it takes two hash codes to verify that a data item does not belong to the set, while (as mentioned) all k hash codes must be computed to give a positive answer (which could still be wrong). In other words, it is much more likely that only one or two hash codes must be verified to show that b does not belong to the set R, than it would be that more hash codes must be checked. Therefore the expected value (average) of the number of checks is two.

As explained, in a Bloom filter, a negative result is always correct, while false positives may occur. For k hash codes and $k \times 2^{13}/\ln(2)$ bits of the vector v (i.e. for $m=k \times 2^{13}/\ln(2)$), and for $n=2^{13}$, the expected probability of a false positive is $2^{-k}$.

Note that the above description is for an embodiment in which there is a Bloom filter procedure for both the Bloom vector data structure of the MWLAN module 11, and also the MGSM module 12. It is of course also possible for there to be only a single, generic, Bloom procedure, e.g. included as part of the authenticator 14.

To save computation, instead of computing k hash codes for each RAND (practically non-invertible mappings from an input to an output), the already used RAND values (128-bit strings) can themselves serve as the hash codes—and using the hash codes in this way is especially reasonable as the RAND values are generated as outputs of hash functions and therefore uniformly distributed. To have the already used RAND values serve as the hash codes, each 128-bit RAND string is split into 8 strings of 16 bits each; each 16-bit string is used as a pointer to a cell in a $m=2^{16}$-bit long data structure (the vector v of the Bloom filter), and the value of the cell pointed to is then set equal to one. (Thus, the $2^{13}$ RAND values provide $t=8 \times 2^{13}$ pointers/hash codes each pointing to one or another of $2^{16}$ bit positions). The probability of a false positive is about $(e-1/e)^8 = 1/39$ for the Bloom filter with these parameters. The probability of false positives can be made smaller by reducing the number of RAND values stored in one filter. For example, if $m=2^{16}$ and $k=8$, we get the probability equal to 1/256 by taking the total number of RAND values to be n=5,678. The size of the filter can be reduced further by allowing false negatives and by not storing the information for all of the RANDs already used. The same effect is achieved by reducing the time interval.

Resetting the Memory

The Bloom filter and similar solutions have an upper limit of data items to be stored. When the upper limit is achieved—i.e. when the Bloom filter is full (because of adding new RAND values to the set R by setting additional components of the Bloom filter data structure/vector to one)—the memory must be reset and re-initialized. Immediately after doing so, a replay of a RAND used before the re-initialization cannot be detected. It is possible to smooth out the effect of memory reset by implementing the filter in more than one part. Taking for example a filter having two parts—an v1 part and a v2 part—only one part at a time is incremented by new information on used RANDs, but both parts are checked for RAND reuse. When first starting, both parts are empty, and one part, say the v1 part, is incremented. After a while, the v1 part fills up, and the v2 part is incremented. When the v2 part fills up, the v1 part is reset. After a while, the v1 part is again full, but this time the v2 part is reset. And so on.

As an implementation note: we have to make sure the range of numbers pointed to by the RAND values is adjusted so that some RANDs have pointers pointing only to one part (i.e. one of the vectors v1 or v2), and other RANDs have pointers pointing to the other part. Otherwise, even if we check all the pointers, we cannot definitely say a candidate RAND is not a member of the set (since we would have thrown away some of the corresponding one-valued components). The idea is that v1 and v2 are separate parts/vectors (both have m cells, numbered 1 . . . m), one of which is "active," and when we store a new RAND we update only the "active" vector. However, when we determine whether a RAND is a replay, we check both vectors.

Handling of Detected Replay

As mentioned previously, the GSM specification allows reuse of RANDs. Therefore the methods presented here are not useful in GSM authentication, since replayed RANDs and false positives may cause uncontrolled problems. As a response to the above-mentioned remark by Patel, the reuse of RANDs will be prohibited in the next version of the EAP SIM draft. More precisely, it will be required that: all RANDs used in one authentication event be different; and (as already required by existing versions of EAP-SIM) the RAND values that have been used for successful authentication of the terminal must not intentionally be reused by the network. Given such conditions, replay detection mechanisms can be implemented in the terminal for SIM-based WLAN authentication (i.e. for EAP/SIM authentication). If a replayed RAND is detected in case of an EAP/SIM RAND challenge, the terminal can react in one of the following ways:

First, the terminal can complete the authentication procedure (i.e. can respond to the network with a message indicating the RAND could not be authenticated), but halt communication after doing so, and then initiate a new authentication event. A particular message indicating the reason for disconnecting can be included. The message can be authenticated using the keys derived in the new authentication event.

Second, the terminal can stop communication immediately after detecting a replayed RAND. It can then send a message to the network indicating the reason for disconnecting. The message is preferably authenticated using a key derived in the previous successful authentication of the terminal by the network.

In both cases, the network should react by sending a new EAP SIM authentication challenge. Thus, false positives can be tolerated in SIM-based WLAN authentication, and Bloom filters or similar data structures (and corresponding procedures) can be used to reduce memory requirements in WLAN terminals. In dual-mode terminals, to avoid uncontrolled problems in GSM authentication, it is recommended to implement the MWLAN data module 11 in a manner that does not give false positives, i.e., by storing the used RAND values in full. However, the size of the MGSM module 12 in dual mode terminals can be reduced by using a Bloom filter or similar data structure (and corresponding procedure).

Figure 3:
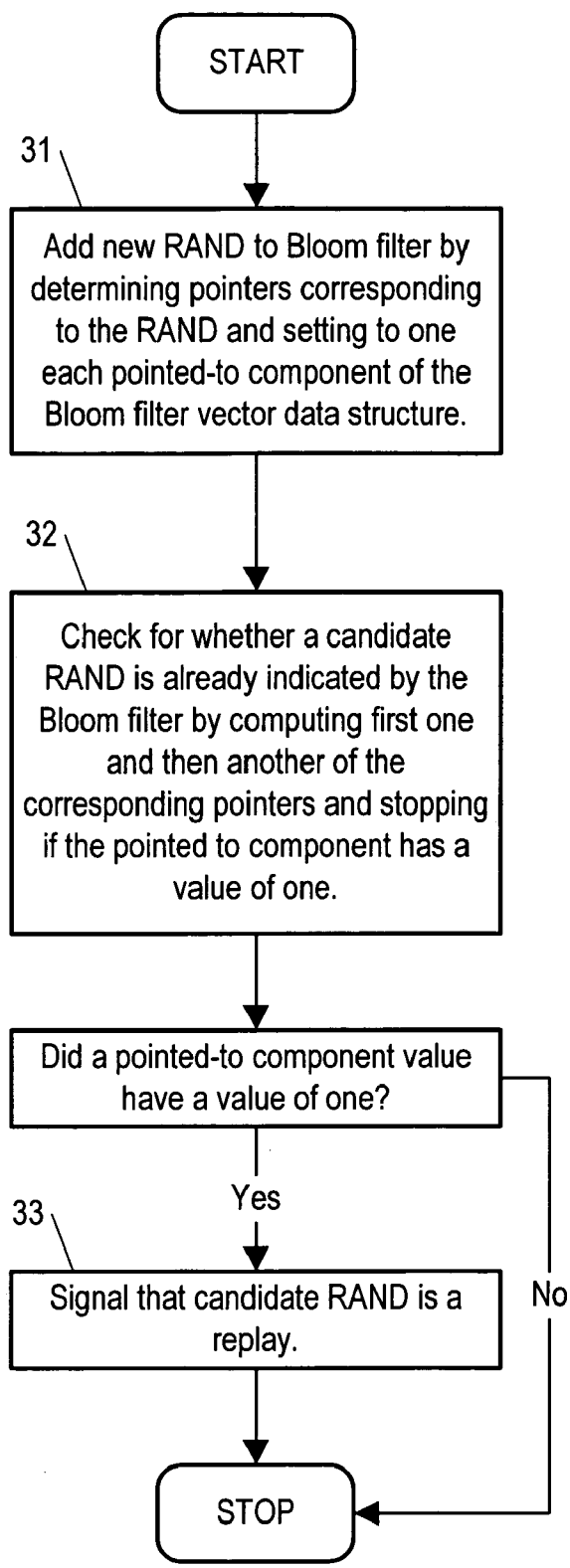
FIG. 3 is a flowchart illustrating a method of testing for RAND replay, according to the invention.

Referring now to FIG. 3, according to a method provided by the invention, in a first step 31, when a mobile terminal according to the invention—and so using a Bloom filter to "store" previously used RANDS—adds a new (used) RAND to the Bloom filter based on a vector data structure v 21 (FIG. 2), it determines pointers corresponding to the RAND and then sets to one each pointed-to component of the Bloom filter vector data structure. After so doing, it discards the RAND. In a next step 32, to determine whether a candidate RAND is a previously used RAND, the Bloom filter checks for whether the candidate RAND is already "stored" in the Bloom filter via the vector v by computing first one and then another of the corresponding pointers and stopping if the pointed-to component of the vector v already has a value of one. If so, then in a next step 33, the Bloom filter signals (to some other module of the terminal) that the candidate RAND is a replay.

Referring back to FIG. 1, the Bloom filter modules 11 12 can themselves be configured to maintain the vector data structure v 21 (FIG. 2)—i.e. to add new RANDs and as described above—or a separate module (not shown) can be used.

The invention has been described in terms (primarily) of the steps of a method. The invention also comprehends an apparatus for performing the above described steps. Thus, for each step described above, there can be a corresponding module of an apparatus, although it is also possible for the functionality for performing more than one of the above-described steps to be incorporated into a single module. Such modules may be implemented as hardware, or may be implemented as software or firmware for execution by a processor. In particular, in the case of firmware or software, the invention is provided as a computer program product including a computer readable storage structure embodying computer program code—i.e. the software or firmware—thereon for execution by a computer processor.

The invention is for use for example by a mobile terminal equipped for cellular communication via one or another radio access network.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for use by a telecommunications terminal in authenticating the telecommunications terminal comprising:
encoding the random numbers previously used for authenticating the telecommunications terminal, so as to provide a data structure consisting of an ordered set of components having respective component values derived from the previously used random numbers, wherein each component has a starting value of zero, but the value is set to one if, based on the order of the component in the ordered set, the component is pointed to by any of a plurality of pointer values each based on all the bits of a respective one of the previously used random numbers; and
checking the data structure to determine whether a candidate random number is not one of the previously used random numbers;
wherein the data structure is such as to at least provide a true answer as to whether the candidate random number is not one of the previously used random numbers.

2. A method as in claim 1, wherein in encoding the previously used random numbers, a set of hash functions is used each providing a value in a range equal to the number of components of the data structure, and for each previously used random number, each of the hash functions is evaluated and the component in the ordered set of components at the position indicated by the hash function value is set to one.

3. A method as in claim 1, wherein in encoding the previously used random numbers, the previously used random numbers are used as the pointer values.

4. A method as in claim 1, wherein the data structure is a multi-part data structure with each part having an upper limit on the number of random number values it can indicate as one of the previously used random number values, wherein each part has values based on only some of the previously used random numbers, and wherein all most recently received random numbers are used in determining component values in only one of the parts, and further wherein when an upper limit is reached for the one of the parts, another of the parts is reset.

5. A computer program product comprising:
a computer readable storage structure embodying computer program code thereon for execution by a computer processor in a terminal,
wherein said computer program code includes instructions for performing the method of claim 1.

6. An apparatus for use by a telecommunication terminal in authenticating the telecommunications terminal to an access network, comprising:
means for encoding random numbers previously used for authenticating the telecommunications terminal, so as to provide a data structure consisting of an ordered set of components having respective component values derived from the previously used random numbers, wherein each component has a starting value of zero, but the value is set to one if, based on the order of the component in the ordered set, the component is pointed to by any of a plurality of pointer values each based on all the bits of a respective one of the previously used random numbers; and means for checking the data structure to determine whether a candidate random number is not one of the previously used random numbers;

wherein the data structure is such as to at least provide a true answer as to whether the candidate random number is not one of the previously used random numbers.

7. A system, comprising:

a telecommunication terminal, and a radio access network configured for cellular communication with the telecommunication terminal, wherein the telecommunication terminal includes an apparatus as in claim 6.

8. An apparatus for use by a telecommunication terminal in authenticating the telecommunications terminal to an access network, comprising an authenticator module and one or more Bloom filter modules, configured to:

encode random numbers previously used for authenticating the telecommunications terminal, so as to provide a data structure consisting of an ordered set of components having respective component values derived from the previously used random numbers, wherein each component has a starting value of zero, but the value is set to one if, based on the order of the component in the ordered set, the component is pointed to by any of a plurality of pointer values each based on all the bits of a respective one of the previously used random numbers; and check the data structure to determine whether a candidate random number is not one of the previously used random numbers;

wherein the data structure is such as to at least provide a true answer as to whether the candidate random number is not one of the previously used random numbers.

9. An apparatus as in claim 8, wherein for encoding the previously used random numbers the authenticator module and one or more Bloom filter modules are configured so that a set of hash functions is used each having a range equal to the number of components of the data structure, and for each previously used random number, each of the hash functions is evaluated and the component in the ordered set of components at the position indicated by the hash function value is set to one.

10. An apparatus as in claim 8, wherein the previously used random numbers are the pointer values.

11. An apparatus as in claim 8, wherein the data structure is a multi-part data structure with each part having an upper limit on the number of random number values it can indicate as one of the previously used random number values, wherein each part has values based on only some of the previously used random numbers, and wherein all most recently received random numbers are used in determining component values in only one of the parts, and further wherein for encoding the previously used random numbers the authenticator module and one or more Bloom filter modules are configured so that when an upper limit is reached for the one of the parts, another of the parts is reset.

* * * * *

UNITED STATES PATENT AND TRADEMARK OFFICE
CERTIFICATE OF CORRECTION

PATENT NO.        : 7,418,595 B2                                    Page 1 of 1
APPLICATION NO.   : 10/751300
DATED             : August 26, 2008
INVENTOR(S)       : Pasi Eronen et al.

It is certified that error appears in the above-identified patent and that said Letters Patent is hereby corrected as shown below:

In column 8 at line 9, (claim 1, line 2) after "terminal" please insert --,--.

In column 8 at line 10, (claim 1, line 3) please delete "the".

Signed and Sealed this

Seventeenth Day of March, 2009

JOHN DOLL
*Acting Director of the United States Patent and Trademark Office*